US011326304B2

(12) United States Patent
Teves et al.

(10) Patent No.: US 11,326,304 B2
(45) Date of Patent: May 10, 2022

(54) PROCESS FOR BONDING A TEXTILE MATERIAL TO AN ELASTOMER

(71) Applicant: ContiTech Antriebssysteme GmbH, Hannover (DE)

(72) Inventors: Reinhard Teves, Seelze (DE); Michael Well, Vechelde (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 199 days.

(21) Appl. No.: 16/754,533

(22) PCT Filed: Aug. 7, 2018

(86) PCT No.: PCT/EP2018/071344
§ 371 (c)(1),
(2) Date: Apr. 8, 2020

(87) PCT Pub. No.: WO2019/096456
PCT Pub. Date: May 23, 2019

(65) Prior Publication Data
US 2020/0347545 A1 Nov. 5, 2020

(30) Foreign Application Priority Data

Nov. 16, 2017 (DE) .................... 10 2017 220 469.9

(51) Int. Cl.
| | | |
|---|---|---|
| *B32B 25/10* | (2006.01) | |
| *B32B 25/16* | (2006.01) | |
| *B32B 37/18* | (2006.01) | |
| *B32B 38/08* | (2006.01) | |
| *B32B 5/02* | (2006.01) | |
| *D06M 101/32* | (2006.01) | |
| *D06M 101/36* | (2006.01) | |
| *D06M 13/224* | (2006.01) | |
| *D06M 15/263* | (2006.01) | |
| *F16G 1/10* | (2006.01) | |
| *F16G 5/08* | (2006.01) | |
| *B32B 25/04* | (2006.01) | |
| *F16G 1/28* | (2006.01) | |
| *F16G 5/20* | (2006.01) | |
| *B66B 7/06* | (2006.01) | |
| *B29L 31/00* | (2006.01) | |

(52) U.S. Cl.
CPC .......... *D06M 15/263* (2013.01); *B32B 5/024* (2013.01); *B32B 25/04* (2013.01); *B32B 25/10* (2013.01); *B32B 25/16* (2013.01); *B32B 37/18* (2013.01); *B32B 38/08* (2013.01); *D06M 13/2246* (2013.01); *F16G 1/10* (2013.01); *F16G 5/08* (2013.01); *B29L 2031/7094* (2013.01); *B32B 2250/02* (2013.01); *B32B 2260/021* (2013.01); *B32B 2260/046* (2013.01); *B32B 2262/0276* (2013.01); *B32B 2319/00* (2013.01); *B32B 2367/00* (2013.01); *B32B 2433/04* (2013.01); *B66B 7/062* (2013.01); *D06M 2101/32* (2013.01); *D06M 2101/36* (2013.01); *F16G 1/28* (2013.01); *F16G 5/20* (2013.01)

(58) Field of Classification Search
CPC ........ B29D 29/08; B29D 29/10; B32B 5/024; B32B 25/04; B32B 25/10; B32B 25/14; B32B 25/16; B32B 37/18; B32B 38/08; B32B 2250/02; B32B 2260/021; B32B 2260/046; B32B 2260/048; B32B 2262/0261; B32B 2262/0269; B32B 2262/0276; B32B 2319/00; B32B 2367/00; B32B 2433/04; B29L 2031/7094; B66B 7/062; C08J 5/0405; C08J 5/042; C08J 5/043; C08J 5/046; C08J 5/06; C08J 5/08; D06M 13/2246; D06M 15/263; D06M 15/51; D06M 15/693; D06M 2101/32; D06M 2101/34; D06M 2101/36; F16G 1/08; F16G 1/10; F16G 1/28; F16G 5/06; F16G 5/08; F16G 5/20

See application file for complete search history.

(56) References Cited

U.S. PATENT DOCUMENTS

| | | | | |
|---|---|---|---|---|
| 5,217,801 A | * | 6/1993 | Hamada | ............... C08J 5/06 427/359 |
| 6,296,588 B1 | * | 10/2001 | Ciemniecki | ............ B29D 29/08 474/268 |
| 6,358,171 B1 | * | 3/2002 | Whitfield | ................. F16G 5/20 474/266 |
| 2012/0142471 A1 | | 6/2012 | Gaska et al. | |
| 2012/0258829 A1 | * | 10/2012 | Little | ................... C08K 5/0025 474/237 |
| 2017/0051810 A1 | * | 2/2017 | Ideguchi | .................. F16G 1/00 |

FOREIGN PATENT DOCUMENTS

EP          1783396 A1    5/2007
WO    WO-2015166929 A1 * 11/2015 ............... F16G 1/00

OTHER PUBLICATIONS

International Search Report dated on Oct. 25, 2018 of PCT application PCT/EP2018/068904 on which this application is based.

*Primary Examiner* — Michael A Tolin
(74) *Attorney, Agent, or Firm* — David L. Cate; Gregory Adams

(57) ABSTRACT

The present invention relates to a process for adhering a textile material to an elastomer, the process comprising the steps of pretreating the textile material with at least one polyester of an α-β-unsaturated carboxylic acid, contacting the pretreated textile material with an unvulcanized elastomer, and vulcanizing the product obtained. The present invention additionally encompasses an elastomer article obtainable by this process and also the use of a polyester of an α-β-unsaturated carboxylic acid for improving the adhesion of a textile material to an elastomer.

18 Claims, No Drawings

PROCESS FOR BONDING A TEXTILE MATERIAL TO AN ELASTOMER

The present invention relates to a process for adhering a textile material to an elastomer, the process comprising the steps of pretreating the textile material with at least one polyester of an α-β-unsaturated carboxylic acid, contacting the pretreated textile material with an unvulcanized elastomer, and vulcanizing the product obtained. The present invention additionally encompasses an elastomer article obtainable by this process and also the use of a polyester of an α-β-unsaturated carboxylic acid for improving the adhesion of a textile material to an elastomer.

For the reinforcement or strengthening of technical elastomer articles, for example conveyor belts, V-belts, hoses or automobile tires, depending on the loading strengthening members are used as load-bearing element and/or for stabilizing the dimensional stability. Various textile materials are frequently used as strengthening members in practice. For bonding to the elastomer, adhesion/adherence systems which withstand a continuous static and dynamic loading of the composite system are used.

Traditionally, adherence of textile materials to elastomers is achieved by using resorcinol-formaldehyde latex (RFL). In what is known as the immersion bath process, the textile material is pretreated with an aqueous RFL impregnation solution, then bonded to the elastomer and lastly dried or baked at temperatures of at least 150° C. (cf. for example Werner Kleemann, "Mischungen für die Elastverarbeitung" [Mixtures for Elastomer Processing], VEB Deutscher Verlag für Grundstoffindustrie, Leipzig 1982, pages 296-309).

However, this conventional process has the disadvantage that the baking procedure is very energy intensive. In addition, the formaldehyde present in the resorcinol-formaldehyde latex is disadvantageous with regard to industrial hygiene. Formaldehyde is placed in category 1B ("presumed to be carcinogenic for humans") in Annex VI to Regulation 2008/1272/EC on the classification, labelling and packaging of substances and mixtures. The use of formaldehyde should therefore be avoided as far as possible.

An object of the present invention is therefore to provide a process for adhering a textile material to an elastomer which avoids the disadvantages presented above and in particular avoids the use of RFL.

This object is achieved by means of the embodiments characterized in the claims.

In particular, a process for adhering a textile material to an elastomer is provided, the process comprising the steps of:
a) pretreating the textile material with at least one polyester of an α-β-unsaturated carboxylic acid,
b) contacting the pretreated textile material with an unvulcanized elastomer, and
c) vulcanizing the product obtained.

The textile material usable for the process according to the invention can be any suitable textile material. The textile material is preferably selected from the group consisting of fibers, threads, sheet textiles and combinations thereof.

In the context of the present invention, a fiber is understood to be a thin, elongate structure having a length-to-diameter ratio of at least 10:1. A fiber can be continuous or of limited length. A continuous fiber (also referred to as filament) refers to a fiber having a length of at least 1000 m. A fiber of limited length refers both to a long fiber having a length of at least 10 cm and to a short fiber having a length of at most 10 cm. According to the invention, preference is given to using short fibers having a length in the range of approximately 1 to 10 cm, particularly preferably in the range of approximately 4 to 8 cm.

The fibers usable for the process according to the invention can be natural fibers or synthetic fibers. Suitable natural fibers are plant fibers (for example cotton fibers (CO), sisal fibers, hemp fibers, linen fibers), animal fibers (for example silk, cashmere, horsehair) and mineral fibers (for example asbestos, fibrous gypsum, wollastonite). Suitable synthetic fibers are fibers made from natural polymers (for example viscose (CV), acetate (CA), triacetate (CTA)), fibers made from synthetic polymers (for example polyester (PES), polyamide (PA), aramid (AR)) and fibers made from inorganic substances (for example ceramic fibers, glass fibers (GF), carbon fibers (CF)). In a preferred embodiment of the present invention, fibers made from synthetic polymer, selected from the group consisting of polyester (PES) (especially polyethylene terephthalate (PET), polytrimethylene terephthalate (PTT), polybutylene terephthalate (PBT)), polyamide (PA) (especially PA6.6, PA12, PA6), polyimide (PI), polyamideimide (PAI), aramid (AR), acrylic (PAN), polytetrafluoroethylene (PTFE), polyethylene (PE) (especially UHMWPE), polypropylene (PP), polyurethane (PU), polybenzimidazole (PBI), melamine (MEL), polyvinyl alcohol (PVA), polycarbonate (PC), polystyrene (PS), polybenzoxazole (PBO), polyphenylene sulfide (PPS), polyether ether ketone (PEEK) and combinations thereof, are used. In another preferred embodiment, fibers made from inorganic substances, selected from the group consisting of ceramic, quartz, glass, basalt, carbon and combinations thereof, are used. Fibers that are particularly preferred according to the invention are viscose fibers (CV), polyester fibers (PES) (especially polyethylene terephthalate fibers (PET)), polyamide fibers (PA) (especially fibers made from PA6.6, PA12 or PA 6), aramid fibers (AR) (especially short aramid fibers), polyurethane fibers (PU), glass fibers (GF), carbon fibers (CS) and combinations thereof.

In the context of the present invention, a thread is understood to mean a composite construction of several fibers with a dominant one-dimensional extent. According to the invention, the thread preferably consists of the abovementioned fibers or combinations thereof. Particular preference according to the invention is given to a thread formed from viscose fibers (CV), polyester fibers (PES) (especially polyethylene terephthalate fibers (PET)), polyamide fibers (PA) (especially fibers made from PA6.6, PA12 or PA6), aramid fibers (AR), polyurethane fibers (PU), glass fibers (GF), carbon fibers (CS) and combinations thereof. A thread formed from cotton fibers (CO) and polyester fibers (PES) constitutes a particularly preferred combination.

The textile material can also be a sheet textile according to the invention. A sheet textile is understood according to the invention to mean a textile material which in contrast to a fiber or a thread does not have a substantially one-dimensional extent but instead a two-dimensional extent, and thus forms a plane. The sheet textiles are preferably selected from the group consisting of woven fabrics, knitted fabrics, nonwovens and combinations thereof. Within the context of the present invention, the term "nonwovens" encompasses both fibrous webs and felts. The sheet textiles usable in the process according to the invention can be produced from any suitable fibers or threads. These have preferably been produced from the fibers and threads described above.

The textile material according to the invention therefore preferably comprises one of the materials mentioned above with reference to the fibers. In particular, the textile material according to the invention comprises cotton (CO), sisal, hemp, linen, silk, cashmere, horsehair, fibrous gypsum, wollastonite, viscose (CV), acetate (CA), triacetate (CTA), polyester (PES) (especially polyethylene terephthalate (PET), polytrimethylene terephthalate (PTT), polybutylene terephthalate (PBT)), polyamide (PA) (especially PA6.6, PA12, PA6), polyimide (PI), polyamideimide (PAI), aramid (AR), acrylic (PAN), polytetrafluoroethylene (PTFE), polyethylene (PE) (especially UHMWPE), polypropylene (PP), polyurethane (PU), polybenzimidazole (PBI), melamine (MEL), polyvinyl alcohol (PVA), polycarbonate (PC), polystyrene (PS), polybenzoxazole (PBO), polyphenylene sulfide (PPS), polyether ether ketone (PEEK), ceramic, quartz, glass, basalt, carbon and combinations thereof. The textile material used in the process according to the invention particularly preferably comprises viscose (CV), polyester (PES) (especially polyethylene terephthalate (PET)), polyamid (PA) (especially PA6.6, PA12, PA6), aramid (AR), polyurethane (PU), glass (GF), carbon (CS) and combinations thereof.

Particular preference is given to the use according to the invention of a textile material selected from woven polyester fabric, woven polyamide fabric, polyester thread, aramid thread, aramid fibers, glass fibers, carbon fibers, viscose fibers and combinations thereof.

The aramid fibers used are preferably short aramid fibers.

The process according to the invention serves for adhering a textile material to an elastomer. An elastomer is understood to mean dimensionally stable yet elastically deformable plastics having a glass transition point which is below room/operating temperature. For the process according to the invention, any suitable elastomers can be used. For the process according to the invention, preference is given to using an elastomer which is a rubber component selected from the group consisting of an ethylene-propylene copolymer (EPM), an ethylene-propylene-diene copolymer (EPDM), a (partially) hydrogenated nitrile rubber (HNBR), a chloroprene rubber (CR), a fluoro rubber (FKM), a natural rubber (NR), a styrene-butadiene rubber (SBR), a butadiene rubber (BR) and combinations thereof. The elastomers used are particularly preferably peroxidically crosslinked or crosslinking rubbers or copolymers.

In step a) of the process according to the invention, the textile material is pretreated with at least one polyester of an α-β-unsaturated carboxylic acid. This ester is the polyester of a polyol with an α-β-unsaturated carboxylic acid. Examples of suitable polyols are ethane-1,2-diol (ethylene glycol), 1,1,1-trimethylolpropane, propane-1,3-diol, butane-1,4-diol, pentane-1,5-diol, hexane-1,6-diol, 3-methylpentane-1,5-diol, heptane-1,7-diol, octane-1,8-diol, nonane-1,9-diol, decane-1,10-diol, dodecane-1,12-diol, oligomers of hexane-1,6-diol, of ethylene and propylene glycol, for example diethylene glycol, triethylene glycol, tetraethylene glycol, dipropylene glycol or tetrapropylene glycol. Suitable α-β-unsaturated carboxylic acids are in particular α-β-unsaturated $C_{3-10}$-carboxylic acids, for example acrylic acid or methacrylic acid. Preference is given to di- and triacrylates or di- and trimethacrylates of polyhydric alcohols. In a particularly preferred embodiment of the present invention, the at least one polyester of an α-β-unsaturated carboxylic acid is selected from the group consisting of trimethylolpropane trimethacrylate, trimethylolpropane triacrylate and combinations thereof. In a preferred embodiment, only one polyester is used, that is to say a mixture of two or more polyesters is not used.

The pretreatment of the textile material with the polyester of an α-β-unsaturated carboxylic acid can be effected by any suitable process, for example by impregnation, immersion or spraying.

In step b) of the process according to the invention, the pretreated textile material is brought into contact with an unvulcanized elastomer. The relevant elastomers have already been described above. For the process according to the invention, preference is given to using an elastomer which is a rubber component selected from the group consisting of an ethylene-propylene copolymer (EPM), an ethylene-propylene-diene copolymer (EPDM), a (partially) hydrogenated nitrile rubber (HNBR), a chloroprene rubber (CR), a fluoro rubber (FKM), a natural rubber (NR), a styrene-butadiene rubber (SBR), a butadiene rubber (BR) and combinations thereof. The elastomers used are particularly preferably peroxidically crosslinked or crosslinking rubbers or copolymers.

Contacting can likewise be effected in any suitable manner. In a preferred embodiment of the present invention, the pretreated textile material is applied to the elastomer, or these are brought together. This process is particularly advantageous for textile materials which are in the form of sheet textiles.

In another preferred embodiment, the textile material that has been pretreated with at least one polyester of an α-β-unsaturated carboxylic acid is broken down into smaller parts or fragments prior to being contacted with the unvulcanized elastomer and is subsequently contacted with the unvulcanized elastomer by being mixed into the unvulcanized elastomer. This process is particularly advantageous for textile materials which are in the form of fibers or threads. It is advantageous for this application in particular if the textile material is short aramid fiber, the at least one polyester of an α-β-unsaturated carboxylic acid is trimethylolpropane trimethacrylate and the elastomer is ethylene-propylene-diene copolymer (EPDM) or a (partially) hydrogenated nitrile rubber (HNBR).

In step c) of the process according to the invention, the product obtained in step b) is vulcanized. The vulcanization step can be performed in a usual manner.

It is possible with the process according to the invention to achieve improved adhesion between the elastomer and the textile material after vulcanization, compared to the use of an untreated textile material. The process according to the invention, in contrast to the conventional processes, also makes it possible to dispense with the use of RFL, which is advantageous for health reasons and from environmental points of view. In addition, the baking step which is necessary for the RFL treatment can be dispensed with.

The present invention further relates to an elastomer article obtainable by the process according to the invention. This elastomer article is preferably in the form of a tape, strap, belt, hose, air spring bellows, expansion joint or a multilayer fabric web. The elastomer article is particularly preferably in the form of a drive belt, wherein the elastomer forms a main body comprising a top ply as belt backing and a substructure having a power transmission zone, wherein the top ply and/or the power transmission zone has/have been provided with the textile material. The drive belt is preferably designed as a flat belt, V-belt, V-ribbed belt, toothed belt, clutch belt or elevator belt.

The present invention also relates to the use of a polyester of an α-β-unsaturated carboxylic acid for improving the adhesion of a textile material to an elastomer.

The invention will now be explained in more detail on the basis of examples.

EXAMPLES

Example 1

Woven polyester fabric is immersed into pure trimethylolpropane trimethacrylate (CAS 3290-92-4), roughly cleaned of excess coating material and laid onto an unvulcanized rubber sheet formed from a mixture based on a peroxide-crosslinked HNBR rubber mixture. The structure is vulcanized under pressure for 20 minutes at 180° C. The following separation forces (determined according to DIN 53530) result for the product obtained by the process according to the invention and also for the corresponding comparison products with RFL treatment or without treatment of the woven polyester fabric:

| | |
|---|---|
| Raw woven polyester fabric without treatment (comparison) | 1.2 N/mm separation force |
| RFL-dipped woven polyester fabric (comparison) | 3.7 N/mm separation force |
| Woven polyester fabric according to the invention with treatment | 2.4 N/mm separation force |

The example above proves that the process according to the invention also achieves a marked improvement in the adhesion between the elastomer and textile material compared to the untreated textile material, although the improvement in the adhesion does not quite approach that of the conventional RFL system.

Example 2

A raw-edged V-belt is manufactured with a woven fabric coated raw woven polyamide fabric that has been immersed in trimethylolpropane triacrylate (CAS 15625-89-5). The belt exhibits a cohesive strength (determined according to DIN 53530) of the woven fabric of 2.5 N/mm compared to 1.9 N/mm for an uncoated woven fabric.

Example 3

A polyester thread is drawn through a bath containing trimethylolpropane triacrylate (CAS 15625-89-5). A V-ribbed belt is manufactured from this thread.

The article displays a pull-out force (determined according to ISO 12046) of 20 N. In contrast, when using a non-coated thread to produce the V-ribbed belt, it exhibits a pull-out force (determined according to ISO 12046) of 14 N.

Example 4

An aramid thread is immersed in trimethylolpropane trimethacrylate (CAS 3290-92-4) and cut into short fiber pieces (short aramid fibers). These fiber pieces are mixed into a peroxidically crosslinked HNBR mixture. After vulcanization, the following values result in the longitudinal direction for the short fibers treated by means of the process according to the invention and, for comparison, for the untreated short fibers and for fibers treated with ester plasticizer (ester of trimellitic acid). In addition, for comparison trimethylolpropane trimethacrylate was also added directly to the mixture, that is to say the fibers were also not treated beforehand with the α-β-unsaturated carboxylic acid here:

| | |
|---|---|
| Short fibers according to the invention | Modulus 10*: 8.1 MPa |
| Untreated short fibers | Modulus 10*: 3.5 MPa |
| Fibers treated with ester plasticizer | Modulus 10*: 1.8 MPa |
| Untreated short fibers, where 3% CAS3290-92-4 was added to the mixture | Modulus 10*: 3.6 MPa |
| Short fibers treated with RFL | Modulus 10*: 8.2 MPa |

*Modulus 10 = stress value at 10% elongation

The invention claimed is:

1. A process for adhering a textile material to an elastomer, the process comprising the steps of:
    a) pretreating the textile material with at least one polyester of an α-β-unsaturated carboxylic acid;
    b) contacting the pretreated textile material with an unvulcanized elastomer; and
    c) vulcanizing the product obtained from the step of contacting the pretreated textile material with an unvulcanized elastomer;
    wherein the textile material is not treated with resorcinol-formaldehyde latex in the process for adhering a textile material to an elastomer.

2. The process as claimed in claim 1, wherein the textile material is selected from the group consisting of fibers, threads, sheet textiles and combinations thereof.

3. The process as claimed in claim 2, wherein the sheet textiles are selected from the group consisting of woven fabrics, knitted fabrics, nonwovens and combinations thereof.

4. The process as claimed in claim 1, wherein the textile material comprises a material selected from the group consisting of polyester, polyamide, aramid, polyurethane, glass, carbon, viscose and combinations thereof.

5. The process as claimed in claim 1, wherein the textile material is selected from the group consisting of woven polyester fabric, woven polyamide fabric, polyester thread, aramid thread, aramid fibers, glass fibers, carbon fibers, viscose fibers and combinations thereof.

6. The process as claimed in claim 1, wherein the at least one polyester of an α-β-unsaturated carboxylic acid is selected from the group consisting of trimethylolpropane trimethacrylate, trimethylolpropane triacrylate and combinations thereof.

7. The process as claimed in claim 1, wherein the unvulcanized elastomer is a rubber component selected from the group consisting of an ethylene-propylene copolymer (EPM), an ethylene-propylene-diene copolymer (EPDM), a hydrogenated nitrile rubber (HNBR), a chloroprene rubber (CR), a fluoro rubber (FKM), a natural rubber (NR), a styrene-butadiene rubber (SBR), a butadiene rubber (BR) and combinations thereof.

8. The process as claimed in claim 1, wherein the textile material that has been pretreated with the at least one polyester of an α-β-unsaturated carboxylic acid is broken down into smaller parts or fragments prior to being contacted with the unvulcanized elastomer and is subsequently contacted with the unvulcanized elastomer by being mixed into the unvulcanized elastomer.

9. The process as claimed in claim 8, wherein the textile material is short aramid fiber, the at least one polyester of an α-β-unsaturated carboxylic acid is trimethylolpropane trimethacrylate and the elastomer is ethylene-propylene-diene copolymer (EPDM) or a hydrogenated nitrile rubber (HNBR).

10. The process as claimed in claim 1, wherein an elastomer article is obtainable by the process.

11. The process as claimed in claim 10, wherein the elastomer article is a tape, strap, belt, hose, air spring bellows, expansion joint or a multilayer fabric web.

12. The process as claimed in claim 10, wherein the elastomer article is a drive belt, wherein the elastomer forms a main body comprising a top ply as belt backing and a substructure having a power transmission zone, wherein the top ply and/or the power transmission zone has/have been provided with the textile material.

13. The process as claimed in claim 12, wherein the drive belt is designed as a flat belt, V-belt, a V-ribbed belt, a toothed belt, a clutch belt or an elevator belt.

14. The process as claimed in claim 12, wherein the textile material is short aramid fiber, wherein the at least one polyester of an α-β-unsaturated carboxylic acid is trimethylolpropane trimethacrylate, and wherein the unvulcanized elastomer is ethylene-propylene-diene copolymer (EPDM).

15. The process as claimed in claim 12, wherein the textile material is short aramid fiber, wherein the at least one polyester of an α-β-unsaturated carboxylic acid is trimethylolpropane trimethacrylate, and wherein the unvulcanized elastomer is hydrogenated nitrile rubber (HNBR).

16. The process as claimed in claim 12, wherein the textile material is short aramid fiber, the α-β-unsaturated carboxylic acid is trimethylolpropane trimethacrylate and the unvulcanized elastomer is peroxidically crosslinked HNBR.

17. The process as claimed in claim 12, wherein the textile material is short aramid fiber having a length in the range of from 4 cm to 8 cm.

18. The process as claimed in claim 12, wherein the textile material that has been pretreated with the at least one polyester of an α-β-unsaturated carboxylic acid is broken down into smaller parts or fragments prior to being contacted with the unvulcanized elastomer and is subsequently contacted with the unvulcanized elastomer by being mixed into the unvulcanized elastomer.

* * * * *